(12) United States Patent
Koike

(10) Patent No.: US 8,792,052 B2
(45) Date of Patent: Jul. 29, 2014

(54) IMAGE PROCESSING APPARATUS AND METHOD OF CONTROLLING THE SAME

(75) Inventor: Toru Koike, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 927 days.

(21) Appl. No.: 12/913,131

(22) Filed: Oct. 27, 2010

(65) Prior Publication Data

US 2011/0128440 A1 Jun. 2, 2011

(30) Foreign Application Priority Data

Dec. 1, 2009 (JP) .................................. 2009-273995
Aug. 20, 2010 (JP) .................................. 2010-185581

(51) Int. Cl.
*H04N 7/01* (2006.01)
*H04N 7/015* (2006.01)
*G06T 1/00* (2006.01)

(52) U.S. Cl.
CPC ................. *G06T 1/00* (2013.01); *H04N 7/0017* (2013.01)
USPC ........... 348/441; 348/581; 348/561; 348/443; 348/445; 382/298; 382/299

(58) Field of Classification Search
USPC ................. 348/441, 443, 445, 561, 581, 704; 382/298, 299
See application file for complete search history.

(56) References Cited

U.S. PATENT DOCUMENTS 7,764,848 B2 * 7/2010 Ida et al. ........................ 382/299
8,081,255 B2 * 12/2011 Koshimizu et al. ........... 348/441

FOREIGN PATENT DOCUMENTS

JP 2005-197910 7/2005

* cited by examiner

*Primary Examiner* — Jefferey Harold
*Assistant Examiner* — Jean W Desir
(74) *Attorney, Agent, or Firm* — Cowan, Liebowitz & Latman, P.C.

(57) ABSTRACT

The frame rate of a pause frame of a moving image is detected. The number of frame images of the moving image to be used in a process of increasing the resolution of a low-resolution image is determined such that a larger number of frame images is set for a higher detected frame rate. In a super-resolution process, a high-resolution image is generated using the determined number of continuous frame images including the pause frame of the moving image. This makes it possible to appropriately determine the number of frames to be referred to in the super-resolution process in accordance with the frame rate of a moving image when generating a high-resolution image from the frames of a low-resolution moving image.

10 Claims, 6 Drawing Sheets

IMAGE PROCESSING APPARATUS AND METHOD OF CONTROLLING THE SAME

BACKGROUND OF THE INVENTION

1. Field of the Invention

The present invention relates to a technique of increasing the resolution of a frame of a low-resolution moving image using a super-resolution processing technique or the like.

2. Description of the Related Art

Some recent image capturing apparatuses such as digital cameras and digital video cameras have a function of capturing a moving image of high frame rate using a high shutter speed. The technique of capturing a moving image of high frame rate is utilized in a scene where the object may be blurred or a scene where the opportunity to capture the image is too important to miss. When capturing and recording such a moving image of high frame rate, the number of frames captured in one second is larger than in normal image capture. Hence, the number of pixels must be decreased in a moving image of higher frame rate in accordance with the limits of processing capability for the recording process. That is, in the moving image of high frame rate, the resolution of one frame image is low. This is because if raising the frame rate in image capture may make the read speed of an image sensor such as a CMOS sensor or the write speed in a recording medium exceed the limit, the recording process may fail.

On the other hand, display resolutions of display devices such as TV sets are increasing, considering the start of digital TV broadcasting. For this reason, when the display device with the high display resolution displays the above-described low-resolution moving image of high frame rate while enlarging it based on the display area, the viewer has an impression that the image lacks sharpness. Especially, displaying a frame image as a still image by, for example, making the moving image pause gives the viewer an impression that the image lacks sharpness.

There is known a technique of, when, for example, making a moving image of high frame rate pause, generating a high-resolution image by referring to a plurality of low-resolution frame images and applying a super-resolution process, and displaying the image on a display device. Japanese Patent Laid-Open No. 2005-197910 discloses a technique of determining, based on the ratio of the display resolution to the resolution of a frame of a moving image of high frame rate, the number of frames to be referred to in the super-resolution process.

In the super-resolution process, generally, as the number of low-resolution images to be referred to increases, the quality of an obtained higher-resolution image improves. In addition, unless low-resolution images to be referred to contain position difference of a moving object or a change in the light source to some extent, it is difficult to generate interpolated pixels between pixels of a higher-resolution image. For these reasons, if the number of frames to be referred to in the super-resolution process is determined based on only the ratio of the display resolution to the resolution of a moving image, as in the prior art, it may be impossible to obtain a high-quality result when, for example, the frame rate is high, and position difference of an object rarely exists between the frames.

SUMMARY OF THE INVENTION

The present invention has been made in consideration of the above-described problem of the prior art. The present invention provides a technique of appropriately determining the number of frames to be referred to in a super-resolution process (resolution upconverting process) when generating a high-resolution image from frames of a low-resolution moving image. The present invention also provides a technique of appropriately determining the interval of a predetermined number of frames to be referred to in a super-resolution process (resolution upconverting process) when generating a high-resolution image from frames of a low-resolution moving image.

The present invention in its first aspect provides an image processing apparatus comprising: a detection unit configured to detect a frame rate of a moving image; a resolution increasing unit configured to, using images of a plurality of frames including a target frame of the moving image, generate a high-resolution image having a resolution higher than that of the target frame; and a determination unit configured to determine, based on the frame rate detected by the detection unit, the number of the plurality of frames to be used by the resolution increasing unit, wherein the determination unit increases the number of the plurality of frames to be used by the resolution increasing unit as the frame rate detected by the detection unit rises.

Further features of the present invention will become apparent from the following description of exemplary embodiments (with reference to the attached drawings).

DESCRIPTION OF THE EMBODIMENTS

First Embodiment

A preferred embodiment of the present invention will now be described in detail with reference to the accompanying drawings. In the following embodiment, an example will be explained in which the present invention is applied to a PC, as an example of an image processing apparatus, capable of playing back a moving image of high frame rate. However, the present invention is applicable to an arbitrary device capable of playing back a moving image of high frame rate. Note that in this embodiment, a "frame rate" is a value defined by the shutter speed when capturing moving image data, and does not necessarily match the frame rate at the time of playback.

Figure 1:
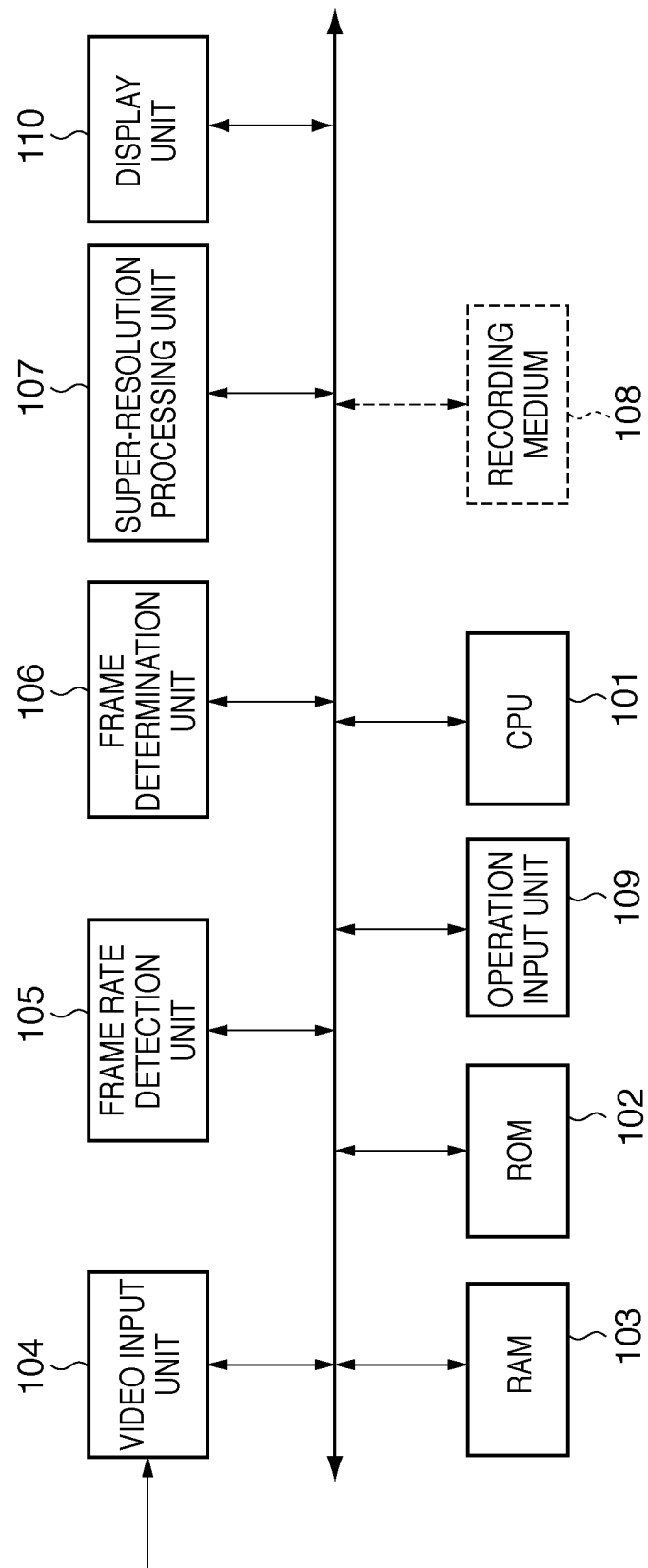
FIG. 1 is a block diagram showing the functional arrangement of a PC according to the first embodiment of the present invention.

FIG. 1 is a block diagram showing the functional arrangement of a PC 100 according to the first embodiment of the present invention.

To control the operation of each block of the PC 100, a CPU 101 sets the register of each block. The CPU 101 reads out the operation program of each block from, for example, a ROM 102 to be described later, and expands and executes the programs on a RAM 103, thereby controlling the operation of each block of the PC 100. The ROM 102 is a readable/writable non-volatile memory, which stores settings such as parameters necessary for the operation of each block of the PC 100 in addition to the operation program of each block. The RAM 103 is a work memory provided in the PC 100, and is used to, for example, temporarily store a moving image.

A video input unit 104 is a block such as a video input board that receives a moving image from an external device connected to the PC 100. The video input unit 104 outputs the received moving image to the RAM 103 and a frame rate detection unit 105. The frame rate detection unit 105 detects the frame rate of the input moving image, and outputs the frame rate information regarding each frame of the moving image to, for example, the RAM 103. The frame rate information can be acquired, for example, by measuring the vertical synchronizing signals of the moving image or from frame information added to the moving image.

Figure 2:
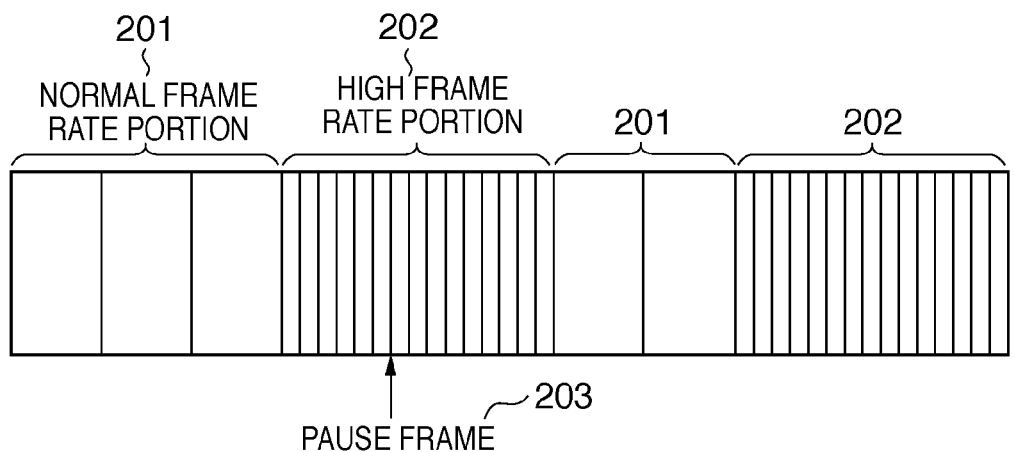
FIG. 2 is a view for explaining a moving image of variable frame rate.

The frame structure of the moving image input from the video input unit 104 in this embodiment will be described with reference to FIG. 2. The moving image of this embodiment is assumed to be a moving image of variable frame rate. FIG. 2 simply expresses the frame structure of the moving image together with the concept of the shutter speed in image capture. As shown in FIG. 2, a moving image 200 includes a normal frame rate portion 201 and a high frame rate portion 202. The normal frame rate portion 201 includes frames captured at a playable frame rate such as 24 fps, 30 fps, or 60 fps that is generally supported by a moving image playback apparatus. The high frame rate portion 202 includes frames captured at a high frame rate such as 240 fps, 300 fps, 600 fps, or 1200 fps. The frame rate detection unit 105 can detect frame rate information at the time of image capture for all frames in such structures.

When, for example, moving image playback has paused, a frame determination unit 106 acquires frame rate information regarding the pause frame stored in the RAM 103, and determines the number of frames to be referred to in a super-resolution image generating process and the reference frames. The frame determination unit 106 also transmits the information regarding the determined reference frames to a super-resolution processing unit 107. The super-resolution processing unit 107 is a block for generating a high-quality high-resolution image by applying a super-resolution image generating process to a plurality of low-resolution images. The super-resolution processing unit 107 acquires, from the RAM 103, frame images of the moving image corresponding to the received information regarding the reference frames, and performs the super-resolution image generating process.

An operation input unit 109 is an input interface provided in the PC 100 to receive and analyze a user input operation. The operation input unit 109 transmits the contents of an input operation to the CPU 101. A display unit 110 is a display device such as an LCD connected to the PC 100, and is used to display a moving image. Note that the CPU 101 can acquire information regarding the display resolution of the display area of the display unit 110 when the display device is connected, and stores the display resolution information in, for example, the ROM 102.

(Super-Resolution Image Display Process)

Figure 3:
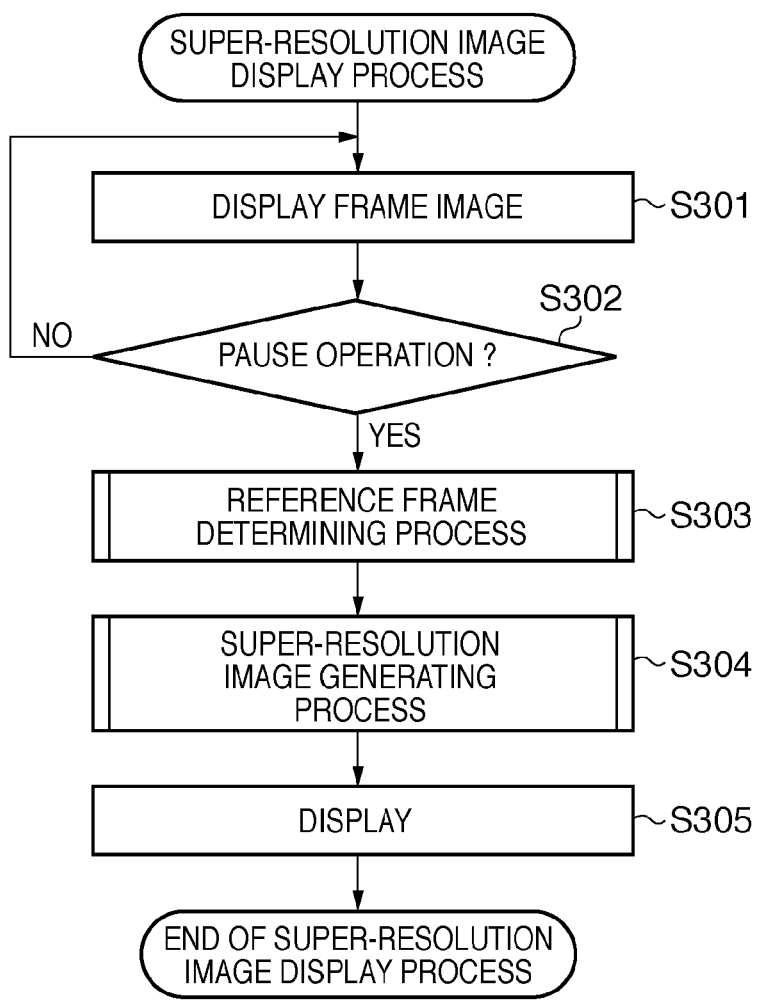
FIG. 3 is a flowchart of a super-resolution image display process according to the first embodiment.

A super-resolution image display process of the PC 100 according to the embodiment with the above-described arrangement will be described with reference to the flowchart of FIG. 3. Note that the super-resolution image display process starts when the operation input unit 109 has received a moving image playback instruction.

Upon receiving, from the operation input unit 109, information representing input of a moving image playback instruction, the CPU 101 acquires the image of the playback start frame of the moving image from the RAM 103, and transmits it to the display unit 110 so as to display the image (S301). In step S302, the CPU 101 determines whether the operation input unit 109 receives a moving image playback pause instruction. If the pause instruction is received, the CPU 101 advances the process to step S303. If no pause instruction is received, the CPU 101 returns the process to step S301.

In step S303, the CPU 101 reads out, from the RAM 103, the frame rate information regarding the pause frame (target frame of the super-resolution process) of the moving image, and transmits it to the frame determination unit 106. The CPU 101 also reads out, from the RAM 103, information regarding the range of frames having the same frame rate as that of the target frame, and transmits it. When, for example, a frame 203 in FIG. 2 has paused, information regarding the range of frames having the same frame rate as that of the target frame represents the following range. It is the high frame rate portion 202 having the same frame rate as that of the pause frame 203 and includes the pause frame 203 in FIG. 2. The CPU 101 causes the frame determination unit 106 to perform a reference frame determining process.

(Reference Frame Determining Process)

Figure 4:
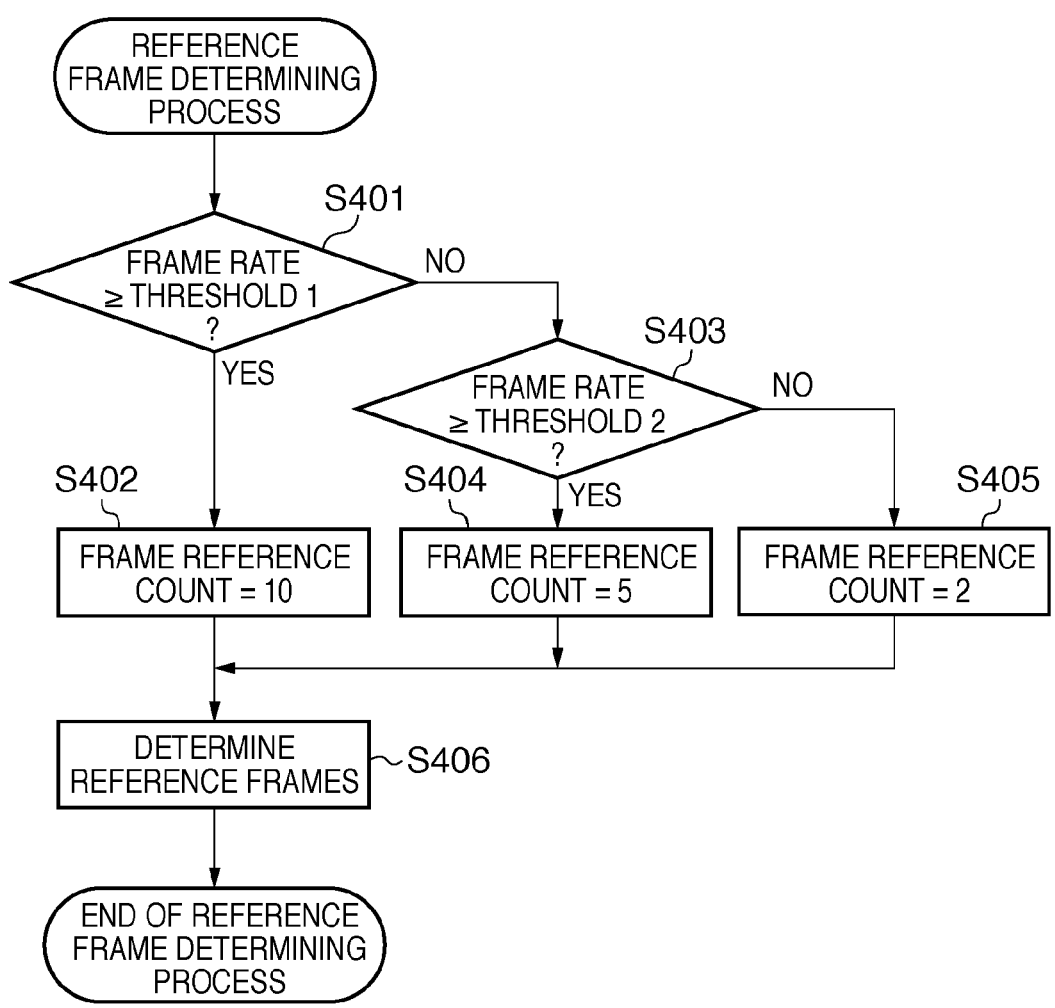
FIG. 4 is a flowchart of a reference frame determining process according to the first embodiment.

The reference frame determining process according to this embodiment will be described in detail with reference to the flowchart of FIG. 4.

In step S401, the CPU 101 transmits, to the frame determination unit 106, information regarding frame rate threshold 1 (P1) stored in, for example, the ROM 102, and causes the frame determination unit 106 to determine whether the value of the frame rate of the pause frame is greater than or equal to threshold 1 (P1). In this reference frame determining process, the value of the frame rate of the pause frame is compared with a frame rate threshold even in steps following S401. Frame rate thresholds are set by, for example, acquiring information regarding all frame rates included in the moving image to be played back, and using some of them. For example, if the moving image to be played back includes information regarding four frame rates 1200 fps, 600 fps, 240 fps, and 60 fps, three frame rates other than 60 fps described above may be set as the thresholds. Alternatively, for example, 600 fps and 240 fps may be set as the thresholds. The frame rate thresholds may be values uniquely set in the PC 100 independently of the moving image to be played back, or values settable by the user. In this embodiment, an example will be described in which the moving image to be played back has information regarding three frame rates, and two thresholds are set.

If the value of the frame rate of the pause frame is greater than or equal to threshold 1 (P1), the CPU 101 advances the process to step S402, and causes the frame determination unit 106 to set 10 as the number of frames to be referred to (frame reference count). The value of frame reference count is, for example, preset in the PC 100 in correspondence with a frame rate. The number of frames is set to enable confirmation of object movement to some degree in continuous frames at each frame rate. For example, when frame rate threshold 1 (P1) is 600 fps, the number of frames is set to allow confirmation of object movement during at least 0.01 sec. In this case, the frame reference count is set to be larger than 0.01 sec/(1/600 fps)=6. The frame reference count value may be settable by the user. The higher the frame rate is, the larger the frame reference count value is.

Note that the frame reference count may be set based on the ratio of the resolution (input resolution) of the input moving image to the display resolution (output resolution) of the moving image and the ratio of the frame rate (input frame rate) of the pause frame to a reference frame rate for display. For example, when the input resolution is 100 pixels, the output resolution is 400 pixels, the input frame rate is 240 Hz, and the reference frame rate is 60 Hz, the frame reference count is given by frame reference count = (output resolution/input resolution) ×
(input frame/reference frame rate) = (400/100) × (240/60) = 16

That is, the frame reference count is 16.

If the value of the frame rate of the pause frame is smaller than threshold 1 (P1) in step S401, the CPU 101 advances the process to step S403. In step S403, the CPU 101 transmits, to the frame determination unit 106, information regarding frame rate threshold 2 (P2) stored in the ROM 102, and causes the frame determination unit 106 to determine whether the value of the frame rate of the pause frame is greater than or equal to threshold 2 (P2). If the value of the frame rate of the pause frame is greater than or equal to threshold 2 (P2), the CPU 101 advances the process to step S404, and causes the frame determination unit 106 to set 5 as the number of frames to be referred to. If the value of the frame rate of the pause frame is smaller than threshold 2 (P2), the CPU 101 advances the process to step S405, and causes the frame determination unit 106 to set 2 as the number of frames to be referred to. Threshold 2 (P2) is set to, for example, a value ½ threshold 1 (P1).

In step S406, the CPU 101 causes the frame determination unit 106 to determine frames to be used for the super-resolution image generating process based on the information regarding the set number of frames to be referred to and the information regarding the range of frames having the same frame rate as that of the pause frame. More specifically, the frame determination unit 106 determines, out of the frames having the same frame rate as that of the pause frame, information regarding frames as many as the frame reference count, which include the pause frame and continue to the pause frame. For example, in FIG. 2, when the frame reference count is 10, the frame determination unit 106 determines, out of the high frame rate portion 202 including the pause frame 203, frames including the pause frame 203 as the frames to be used in the super-resolution image generating process. Note that the frames to be used in the super-resolution image generating process may be determined out of the frames before and after the pause frame or the frames immediately before or immediately after the pause frame. If the frame reference count is larger than the number of frames within the range of frames having the same frame rate as that of the pause frame, for example, the frames short of the frame reference count may be made up by using the first frame of the range a plurality of number of times. The CPU 101 causes the frame determination unit 106 to transmit the information regarding the thus determined reference frames to be used in the super-resolution image generating process to the super-resolution processing unit 107, thereby ending the reference frame determining process.

In step S304, the CPU 101 causes the super-resolution processing unit 107 to execute the super-resolution image generating process.

(Super-Resolution Image Generating Process)

Figure 5:
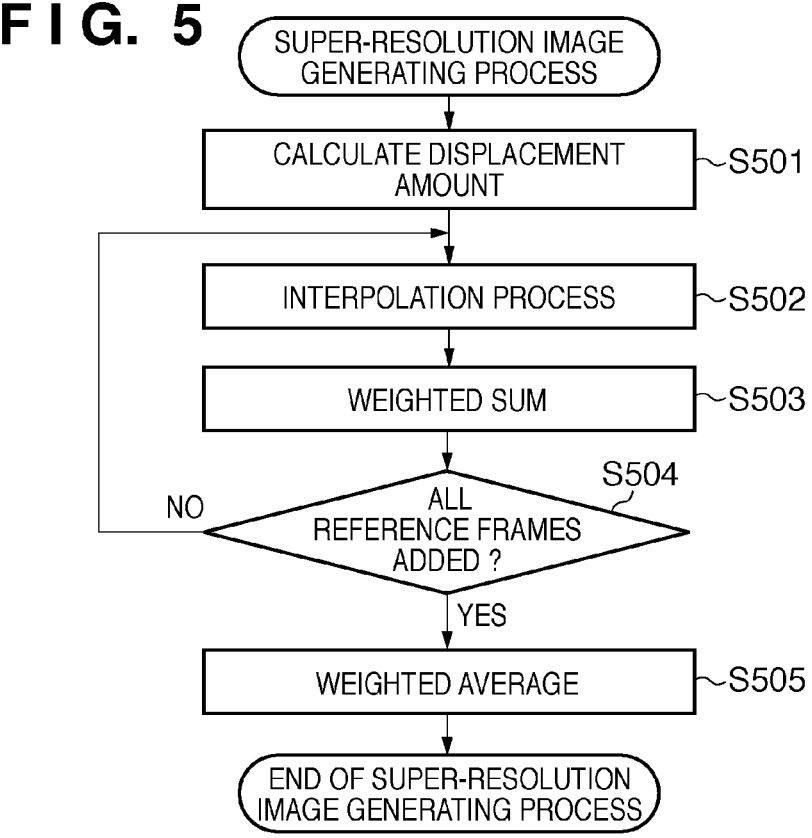
FIG. 5 is a flowchart of a super-resolution image generating process according to the first embodiment.
Figure 6:
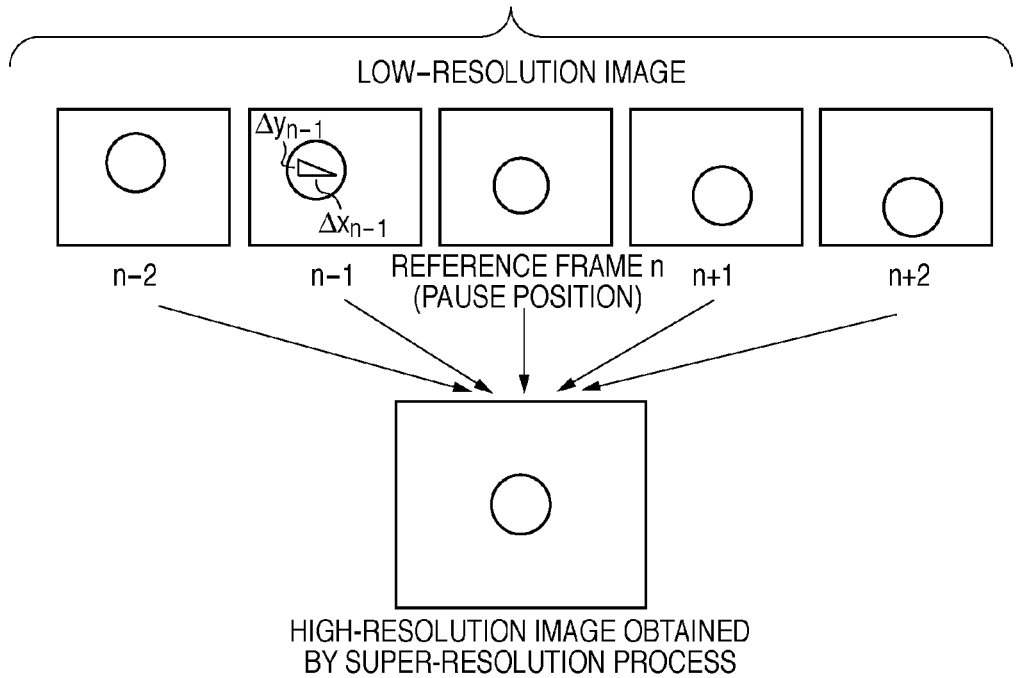
FIG. 6 is a view for explaining the super-resolution image generating process according to the first embodiment.

The super-resolution image generating process will be described with reference to the flowchart of FIG. 5 and FIG. 6.

Under the control of the CPU 101 in accordance with the information regarding reference frames to be used in the super-resolution image generating process, which is received from the frame determination unit 106, the super-resolution processing unit 107 acquires the images of the frames from the RAM 103. In step S501, the CPU 101 causes the super-resolution processing unit 107 to calculate, for each of the reference frame images to be used in the super-resolution image generating process, the displacement amount of the object image relative to the image of the pause frame (target frame).

The process in steps S502 to S504 is applied to the image of each frame, and repeatedly performed for all reference frames to be used in the super-resolution image generating process.

In step S502, the super-resolution processing unit 107 generates an interpolated image for the target frame. The super-resolution processing unit 107 corrects the displacement amount of the target frame image calculated in step S501, and generates an interpolated image by high-density integration of the image of moving image resolution to the display resolution. For example, when generating an interpolated image using a bi-linear method, values obtained by adding a predetermined weight to peripheral pixels around a pixel of the target frame image are averaged, thereby generating an interpolated image.

In step S503, for the interpolated image of the target frame generated in step S502, the super-resolution processing unit 107 integrates weighted sum coefficients determined in accordance with the displacement amounts and the frame reference count, and adds the images to image data to be generated as a super-resolution image. In step S504, the CPU 101 determines whether all reference frames have undergone the process, and causes the super-resolution processing unit 107 to repeat the process until all reference frames have undergone the process in steps S502 and S503. More specifically, in step S503, the super-resolution processing unit 107 adds the interpolated images generated by correcting the displacement in all reference frames while integrating the weighted sum coefficients corresponding to the displacement amounts, thereby generating a weighed sum super-resolution image. For example, assume that the super-resolution image generating process is performed using reference frames (..., n−2, n−1, n+1, n+2, ...) before and after the target frame (nth frame) that has paused, as shown in FIG. 6. At this time, the displacement amount of, for example, the (n−1)th frame out of the reference frames before and after the target frame is represented by $\Delta x_{n-1}$ and $\Delta y_{n-1}$. Based on the two displacement amounts and a frame reference count m, a weighted sum coefficient k is expressed by $$k = f(\Delta x_{n-1}, \Delta y_{n-1}, m)$$

In step S505, the super-resolution processing unit 107 weights and averages the weighted sum super-resolution images obtained by the repetitive process in steps S502 to S504, thereby obtaining a super-resolution image having high resolution and high quality. When the high-quality super-resolution image is thus generated, the CPU 101 ends the super-resolution image generating process.

In step S305, the CPU 101 transmits the super-resolution image the super-resolution processing unit 107 has generated by increasing the resolution to the display unit 110 so as to display the image in the display area. Note that although in this embodiment, the super-resolution image is generated at point in time when the moving image is paused, the present invention is not limited to this. For example, the CPU 101 may determine user's input of print instruction during display of one frame of a moving image, cause the super-resolution processing unit 107 to perform the super-resolution image generating process, and transmit the obtained image to a connected printing device.

If the processing capability is sufficiently high, the super-resolution process may be performed in real time while playing back and displaying a moving image. That is, the super-resolution process may be performed for each displayed frame using frames in number corresponding to the frame rate. Alternatively, when the PC 100 is idle or the like, moving image data stored in a recording medium 108 may undergo the super-resolution process in advance. In this case as well, the super-resolution process is performed for each frame of the moving image stored in the recording medium 108 using frames in number corresponding to the frame rate.

Note that although the moving image is received from the video input unit 104 in the above-described embodiment, the moving image may be stored in the recording medium 108 as indicated by the dotted line in FIG. 1. The recording medium 108 is a memory device such as the internal memory of the PC 100, or a memory card or HDD detachable from the PC 100. In the above-described embodiment, the super-resolution image display process is always performed when the moving image has paused. However, the super-resolution image generating process may be performed only when the pause frame 203 is included in the high frame rate portion 202. This is because the image capturing resolution can be increased for a moving image in the normal frame rate portion 201 which is a moving image captured at the normal frame rate. In the above-described embodiment, the frame reference count is determined by detecting the frame rate upon capturing the moving image. However, the present invention is not limited to this. For a moving image containing no frame rate information upon image capture, such as a CG video or a moving image having undergone a frame rate conversion process, the frame reference count may be determined by detecting the frame rate at the time of playback.

In this embodiment, a high-resolution image is generated using a plurality of continuous frame images of a low-resolution moving image. However, using a plurality of continuous frame images is not always necessary. For example, the super-resolution process of an MPEG (Moving Picture Expert Group) moving image may be performed using only I frame images without using P and B frame images. In this case, the super-resolution process is performed using a plurality of intermittent I frame images.

As described above, the image processing apparatus according to this embodiment can appropriately determine the number of frames to be referred to in the super-resolution process (resolution upconverting process) in accordance with the frame rate of a moving image when generating a high-resolution image from frames of a low-resolution moving image. More specifically, the image processing apparatus detects the frame rate of a moving image at the point in time of pause frame capture, and determines the number of frame images of the moving image to be used in a process of increasing the resolution of the low-resolution image such that a larger number of frame images is set for a higher detected frame rate. In the super-resolution process, the image processing apparatus generates a high-resolution image using the determined number of reference frame images including the pause frame of the moving image.

This makes it possible to provide a high-quality high-resolution image without giving the viewer an impression that the moving image lacks sharpness when a frame image of the moving image is displayed as a still image by, for example, making the moving image pause. More specifically, even for a moving image of high frame rate in which position difference of an object rarely exists between the frames, a high-quality image can be obtained by executing the super-resolution process using many reference frame images.

Second Embodiment

In the above first embodiment, a method of appropriately determining the number of frames to be referred to in the super-resolution process (resolution upconverting process) in accordance with the frame rate of a moving image when generating a high-resolution image from frames of a low-resolution moving image has been described. In the second embodiment, a technique of appropriately determining the interval of frames to be referred to in the super-resolution process (resolution upconverting process) in accordance with the frame rate of a moving image when generating a high-resolution image from a predetermined number of frames of a low-resolution moving image will be explained. Note that a PC 100 of this embodiment is assumed to have the same arrangement as that of the PC 100 of the above-described first embodiment, and a description of each block of the PC 100 will not be repeated.

(Reference Frame Determining Process)

Figure 7:
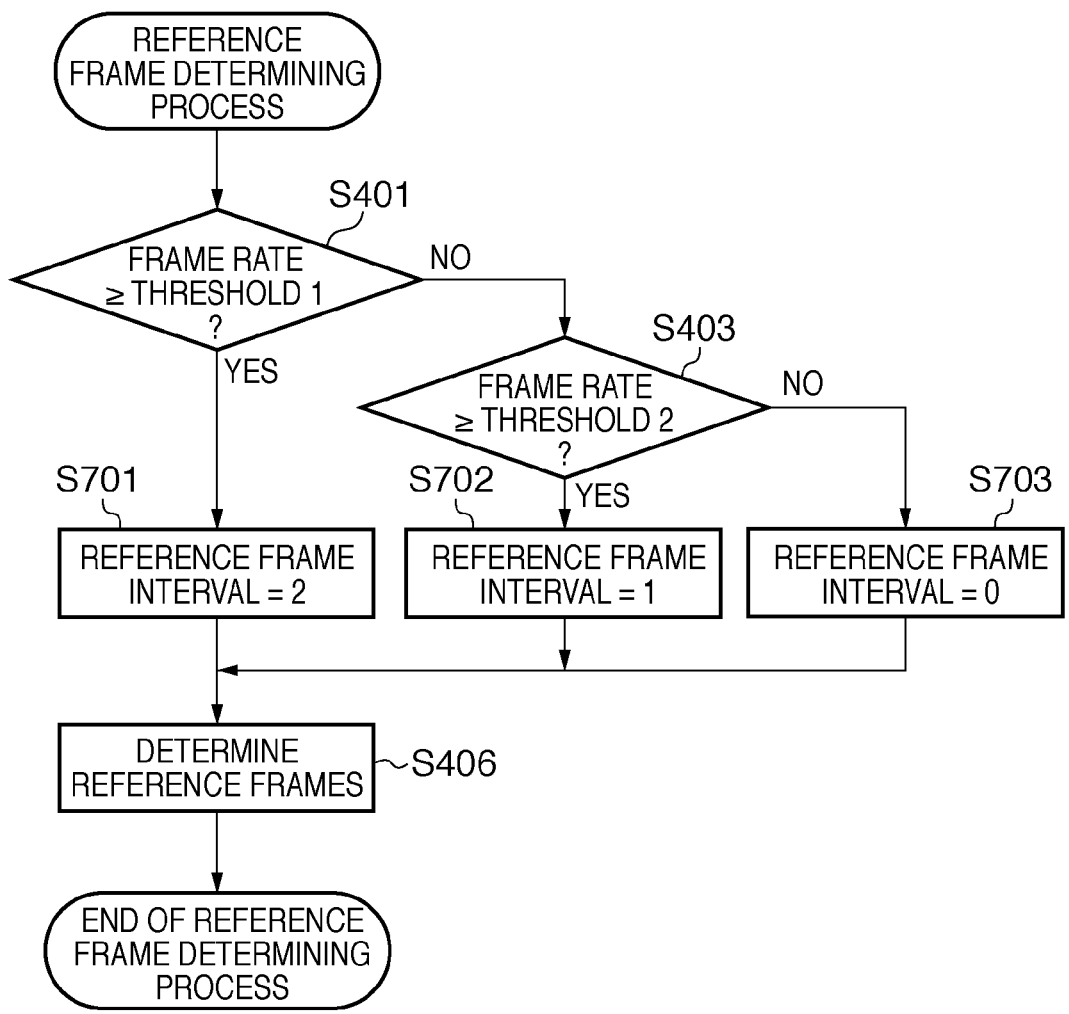
FIG. 7 is a flowchart of a reference frame determining process according to the second embodiment.

The reference frame determining process according to this embodiment will be described below in detail with reference to the flowchart of FIG. 7. Note that in this reference frame determining process, the same step numbers as in the first embodiment indicate steps of the same processes, and a description thereof will not be repeated. Only steps characteristic in this embodiment will be described.

Note that in the super-resolution image generating process executed in step S304 of the super-resolution image display process performed by the PC 100 according to this embodiment, a predetermined number of frames of a low-resolution moving image are used in the super-resolution process. More specifically, in the super-resolution image display process, a method of determining, based on the frame rate of a moving image, the interval of the predetermined number of frames so as to determine the predetermined number of frames of the moving image to be used in the super-resolution image generating process will be described. Note that the information regarding the number of frames of the moving image to be used in the super-resolution image generating process need only be stored in, for example, a ROM 102. A CPU 101 reads it out from the ROM 102 when executing the reference frame determining process.

Figure 8A:
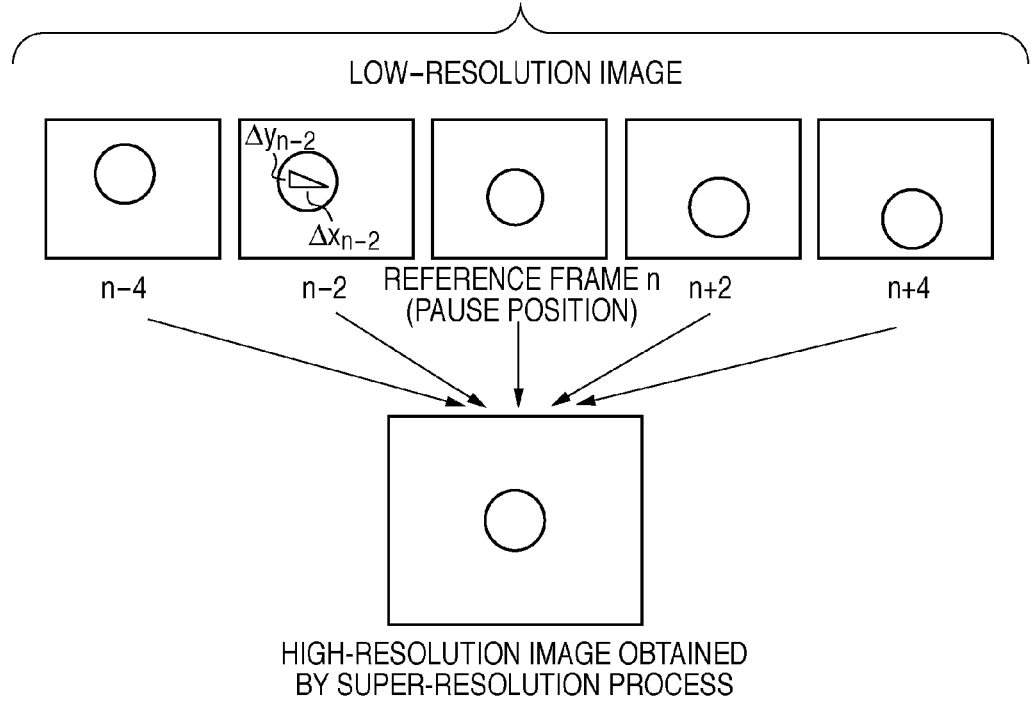
FIGS. 8A and 8B are views for explaining a super-resolution image generating process according to the second embodiment.
Figure 8B:
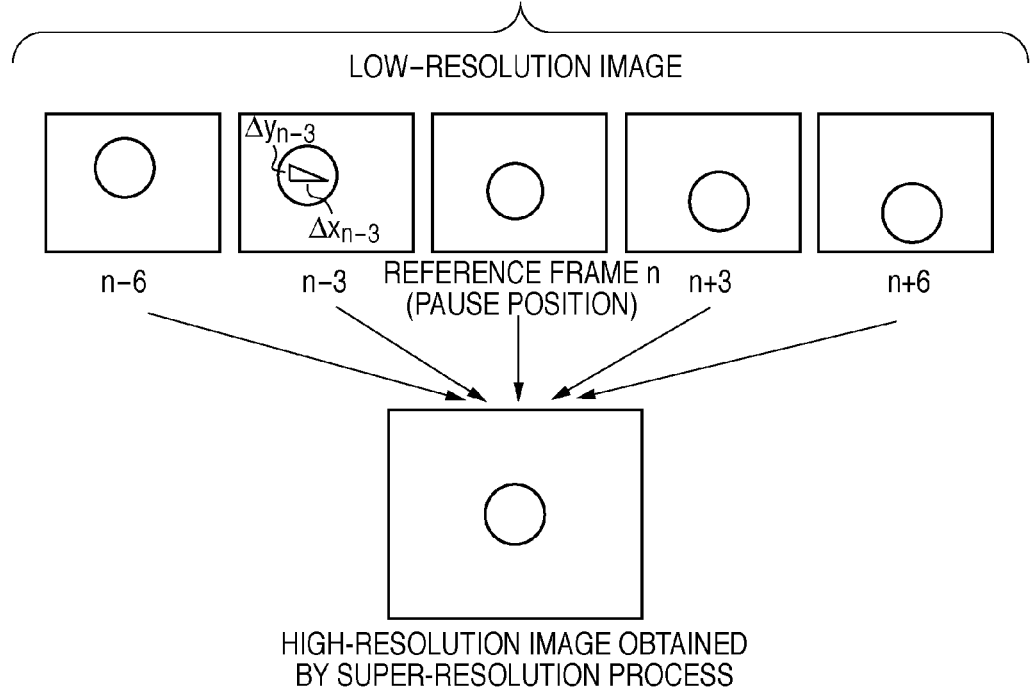

If the value of the frame rate of the pause frame is greater than or equal to threshold 1 (P1), the CPU 101 causes a frame determination unit 106 in step S701 to set 2 as the interval of the predetermined number of frames to be referred to. FIG. 8B shows that when the interval of five frames to be referred to is 2, reference frames (n−6, n−3, n+3, and n+6) before and after the target frame (nth frame) that has paused are used in the super-resolution image generating process. The value of the interval of the predetermined number of frames to be referred to is, for example, preset in the PC 100 in correspondence with a frame rate. The interval is set to enable confirmation of object movement to some degree in continuous frames at each frame rate. Note that the value of the interval of the predetermined number of frames to be referred to may be settable by the user. The higher the frame rate is, the larger the frame interval value is.

If the value of the frame rate of the pause frame is greater than or equal to threshold 2 (P2), the CPU 101 causes the frame determination unit 106 in step S702 to set 1 as the interval of the predetermined number of frames to be referred to. FIG. 8A shows that when the interval of five frames to be referred to is 1, reference frames (n−4, n−2, n+2, and n+4) before and after the target frame (nth frame) that has paused are used in the super-resolution image generating process. If the value of the frame rate of the pause frame is smaller than threshold 2 (P2), the CPU 101 causes the frame determination unit 106 in step S703 to set 0 as the interval of the predetermined number of frames to be referred to. Threshold 2 (P2) is set to, for example, a value ½ threshold 1 (P1).

As described above, the image processing apparatus according to this embodiment can appropriately determine the interval of frames to be referred to in the super-resolution process (resolution upconverting process) in accordance with the frame rate of a moving image when generating a high-resolution image from a predetermined number of frames of a low-resolution moving image. More specifically, the image processing apparatus detects the frame rate of a moving image at point in time of pause frame capture, and determines the interval of frame images of the moving image to be used in a process of increasing the resolution of the low-resolution image such that a larger frame interval is set for a higher detected frame rate. In the super-resolution process, the image processing apparatus generates a high-resolution image using the determined reference frame images including the pause frame of the moving image.

This makes it possible to provide a high-quality high-resolution image without giving the viewer an impression that the moving image lacks sharpness when a frame image of the moving image is displayed as a still image by, for example, making the moving image pause. More specifically, even for a moving image of high frame rate in which position difference of an object rarely exists between the frames, a high-quality image can be obtained by executing the super-resolution process using a predetermined number of reference frame images at an appropriate interval in which position difference of an object exists.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-273995, filed Dec. 1, 2009, and No. 2010-185581, filed Aug. 20, 2010, which are hereby incorporated by reference herein in their entirety.

What is claimed is:

1. An image processing apparatus comprising:
   a detection unit configured to detect a frame rate of a moving image;
   a resolution increasing unit configured to, using images of a plurality of frames including a target frame of the moving image, generate a high-resolution image having a resolution higher than that of the target frame; and
   a determination unit configured to determine, based on the frame rate detected by said detection unit, the number of the plurality of frames to be used by said resolution increasing unit,
   wherein said determination unit increases the number of the plurality of frames to be used by said resolution increasing unit as the frame rate detected by said detection unit rises.

2. The apparatus according to claim 1, wherein said determination unit determines the number of the plurality of frames to be used by said resolution increasing unit by comparing the frame rate detected by said detection unit with a predetermined threshold.

3. The apparatus according to claim 1, wherein when the frame rate detected by said detection unit is less than a predetermined threshold, said resolution increasing unit does not generate the high-resolution image.

4. The apparatus according to claim 1, further comprising a display unit configured to display the high-resolution image,
   wherein said determination unit determines the number of the plurality of frames to be used by said resolution increasing unit based on a product of a ratio of a display resolution of said display unit to a resolution of the moving image and a ratio of the frame rate detected by said detection unit to a predetermined reference frame rate.

5. The apparatus according to claim 1, further comprising a playback unit configured to play back the moving image,
   wherein the target frame is a frame upon making the moving image pause, and
   said detection unit detects a frame rate of the target frame.

6. The apparatus according to claim 1, wherein said detection unit is configured to detect a frame rate of the target frame upon image capture.

7. An image processing apparatus comprising:
   a detection unit configured to detect a frame rate of a moving image;
   a resolution increasing unit configured to, using images of a plurality of frames including a target frame of the moving image, generate a high-resolution image having a resolution higher than that of the target frame; and
   a determination unit configured to determine, based on the frame rate detected by said detection unit, an interval of the plurality of frames to be used by said resolution increasing unit,
   wherein said determination unit increases the interval of the frames to be used by said resolution increasing unit as the frame rate detected by said detection unit rises.

8. The apparatus according to claim 7, wherein said determination unit determines the interval of the frames to be used by said resolution increasing unit by comparing the frame rate detected by said detection unit with a predetermined threshold.

9. A method of controlling an image processing apparatus, comprising the steps of:
- detecting a frame rate of a moving image;
- generating a high-resolution image having a resolution higher than that of a target frame of the moving image using images of a plurality of frames including the target frame; and
- determining, based on the frame rate detected in the step of detecting, the number of the plurality of frames to be used in the step of generating the high-resolution image,
- wherein in the step of determining, the number of the plurality of frames to be used in the step of generating is increased as the frame rate detected in the step of detecting rises.

10. A method of controlling an image processing apparatus, comprising the steps of:
- detecting a frame rate of a moving image;
- generating a high-resolution image having a resolution higher than that of a target frame of the moving image using images of a plurality of frames including the target frame; and
- determining, based on the frame rate detected in the step of detecting, an interval of the plurality of frames to be used in the step of generating the high-resolution image,
- wherein in the step of determining, the interval of the frames to be used in the step of generating is increased as the frame rate detected in the step of detecting rises.

* * * * *